US 6,826,038 B2

(12) United States Patent
Chen

(10) Patent No.: US 6,826,038 B2
(45) Date of Patent: Nov. 30, 2004

(54) FRONT BEZEL ASSEMBLY

(75) Inventor: Li Ping Chen, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/309,455

(22) Filed: Dec. 3, 2002

(65) Prior Publication Data

US 2004/0032707 A1 Feb. 19, 2004

(30) Foreign Application Priority Data

Aug. 16, 2002 (TW) ...................................... 91212777 U

(51) Int. Cl.⁷ ................................................. G06F 1/16
(52) U.S. Cl. ...................................... 361/679; 361/683
(58) Field of Search ................................. 361/683–687

(56) References Cited

U.S. PATENT DOCUMENTS 5,067,041 A * 11/1991 Cooke et al. ............... 361/685

* cited by examiner

*Primary Examiner*—Yean-Hsi Chang
(74) *Attorney, Agent, or Firm*—Wei Te Chung

(57) ABSTRACT

A front bezel assembly includes an enclosure (20) for securing an electronic device (60) therein, and a front bezel (40). The enclosure includes a front plate (22) defining two slots (24) in opposite ends thereof, and two cutouts (26) below respective slots. The bezel includes a body (41) and two spaced latches (42). Each latch includes an engaging portion (44) extending perpendicularly from an inside of the body, an abutting portion (46) extending outwardly and downwardly from the engaging portion, and a catch (50) formed at a bottom end of the abutting portion. The engaging portions engage in the slots to position the bezel in X axis directions. The catches engage in the cutouts to position the bezel in Z axis directions. The abutting portions sandwich the front plate with the body to position the bezel in Y axis directions. The bezel is thus securely attached to the enclosure.

11 Claims, 3 Drawing Sheets

FRONT BEZEL ASSEMBLY

BACKGROUND OF THE INVENTION

1. Field of the Invention

The present invention relates to front bezel assemblies, and particularly to a front bezel assembly having a front bezel readily and detachably attached to an enclosure.

2. Related Art

Popular electronic devices for computers or servers include hard disk drives (HDDs), floppy disk drives (FDDs) and Compact Disk-Read-Only Memories (CD-ROMs). These electronic devices are typically secured in metal enclosures. Plastic front bezels are then attached to front plates of the enclosures to cover the front plates.

A front bezel is usually attached to an enclosure by heat fusion or with screws. However, when the front bezel is attached by fusion, it is inseparable from the enclosure. If either the front bezel or the enclosure is damaged, the other undamaged part needs to be replaced too. This is unnecessarily wasteful and costly. Taiwan patent application No. 88209964 discloses an enclosure for securing an HDD therein. The enclosure comprises a chassis and a cover attached on the chassis. A front bezel is secured on front portions of the chassis and the cover by screws. However, attaching the front bezel by screws is unduly laborious and time-consuming. Furthermore, a tool for effecting attachment is needed.

SUMMARY OF THE INVENTION

Accordingly, an object of the present invention is to provide a front bezel assembly having a front bezel which can be readily and detachably secured to an enclosure.

To achieve the above-mentioned object, a front bezel assembly in accordance with the present invention comprises an enclosure for securing an electronic device therein, and a front bezel. The enclosure comprises a front plate and a pair of side plates. The front plate defines a pair of slots in opposite ends thereof, and a pair of cutouts below respective slots. The front bezel includes a body and a pair of spaced latches. Each latch includes an engaging portion extending perpendicularly from an inside of the body, an abutting portion extending outwardly and downwardly from the engaging portion, and a catch formed at a bottom end of the abutting portion. The engaging portions engage in the corresponding slots to position the front bezel in X axis directions. The catches engage in the corresponding cutouts to position the front bezel in Z axis directions. The abutting portions sandwich the front plate with the body to position the front bezel in Y axis directions. The front bezel is thus securely attached to the enclosure.

Other objects, advantages and novel features of the present invention will be drawn from the following detailed description of a preferred embodiment of the present invention with attached drawings, in which:

DESCRIPTION OF THE PREFERRED EMBODIMENT

Figure 1:
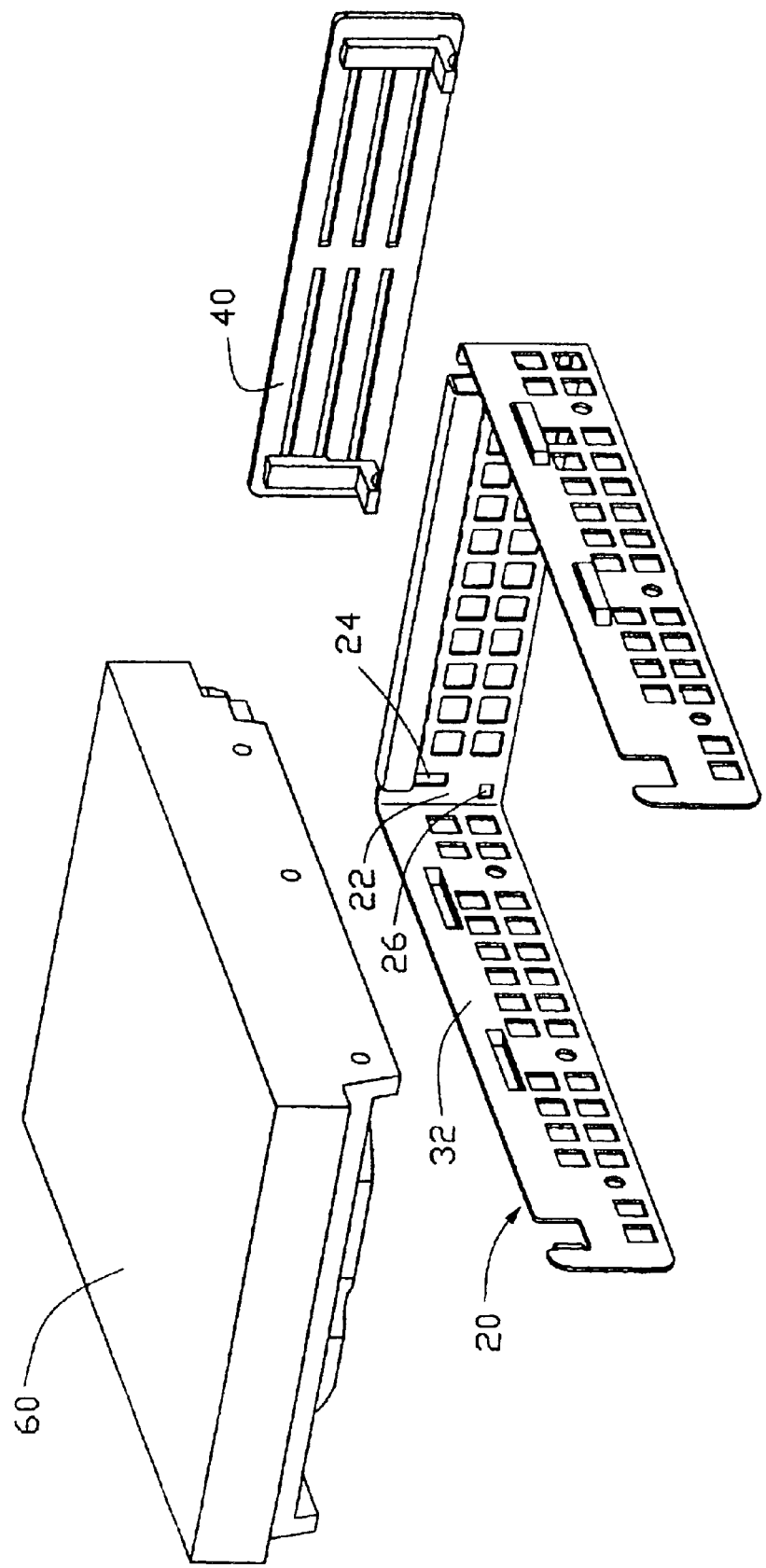
FIG. 1 is an exploded isometric view of a front bezel assembly in accordance with the present invention, showing a front bezel and an enclosure of the front bezel assembly together with an HDD.

FIG. 1 of the attached drawings shows a front bezel assembly in accordance with the present invention, together with an electronic device 60. The front bezel assembly comprises an enclosure 20 and a front bezel 40. The electronic device 60 can be, for example, a hard disk drive (HDD), a floppy disk drive (FDD), a computer, and so on. For the sake of simple illustration of the preferred embodiment, the electronic device 60 is hereinafter assumed to be an HDD.

The enclosure 20 comprises a front plate 22, and a pair of side plates 32 extending rearwardly from opposite side edges of the front plate 22. The front plate 22 defines a pair of vertical slots 24 in respective opposite ends thereof. The vertical slots 24 span from a top edge of the front plate 22. A pair of cutouts 26 is defined in the front plate 22. Each cutout 26 is located below a corresponding vertical slot 24 and near a corresponding side plate 32.

Figure 2:
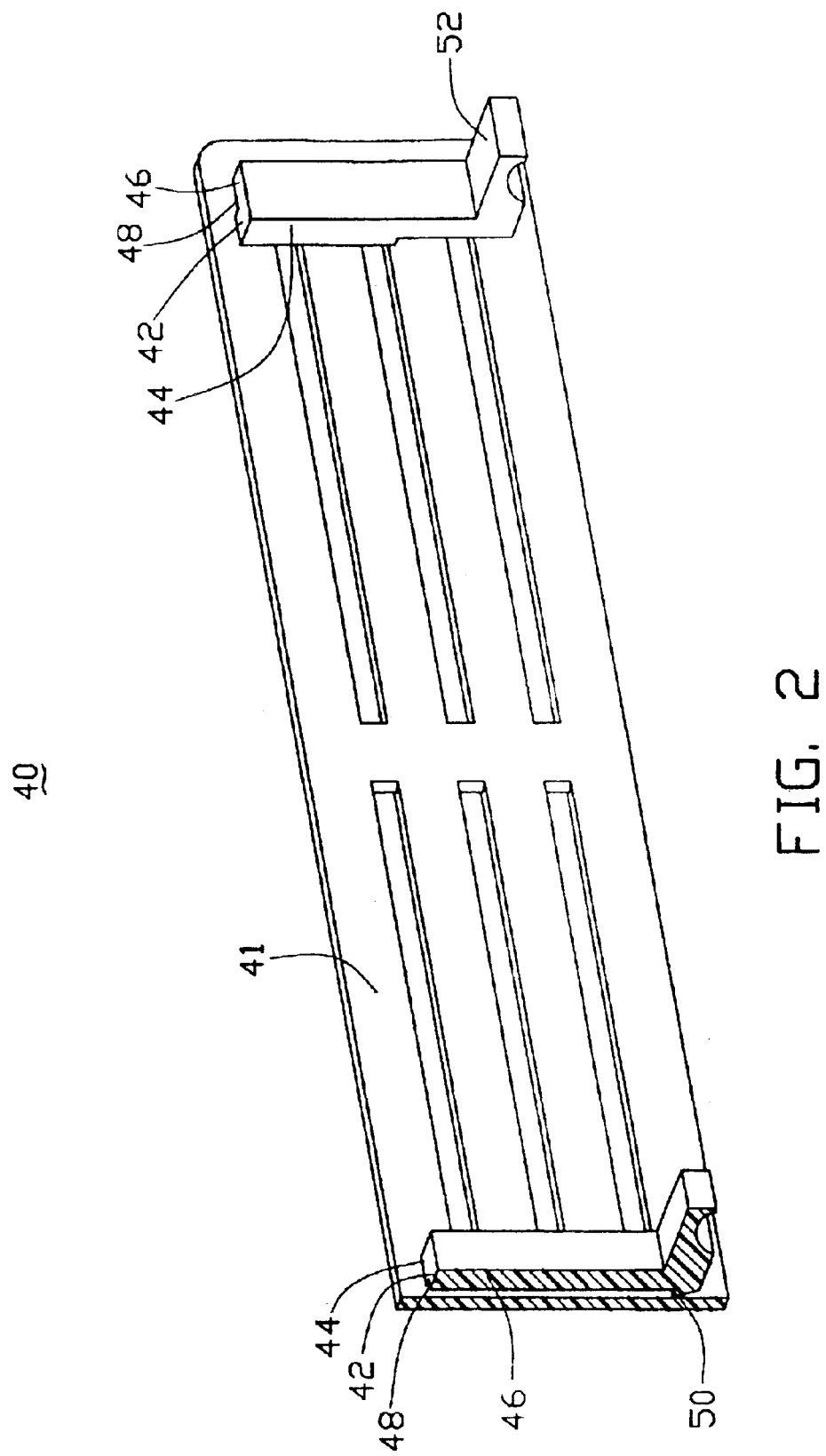
FIG. 2 is an enlarged, cut-away isometric view of the front bezel of FIG. 1, viewed from another aspect.

Referring also to FIG. 2, the front bezel 40 comprises a body 41, and a pair of latches 42 formed at respective opposite ends of an inside face of the body 41. Each latch 42 comprises an engaging portion 44 extending perpendicularly from the inside face of the body 41, and an abutting portion 46 extending perpendicularly outwardly and perpendicularly downwardly from the engaging portion 44. The abutting portion 46 is thus spaced from the body 41, thereby defining a gap 48 therebetween. The abutting portion 46 has a catch 50 formed on a front face of a bottom end thereof. A handle 52 extends rearwardly from the bottom end of the abutting portion 46.

Figure 3:
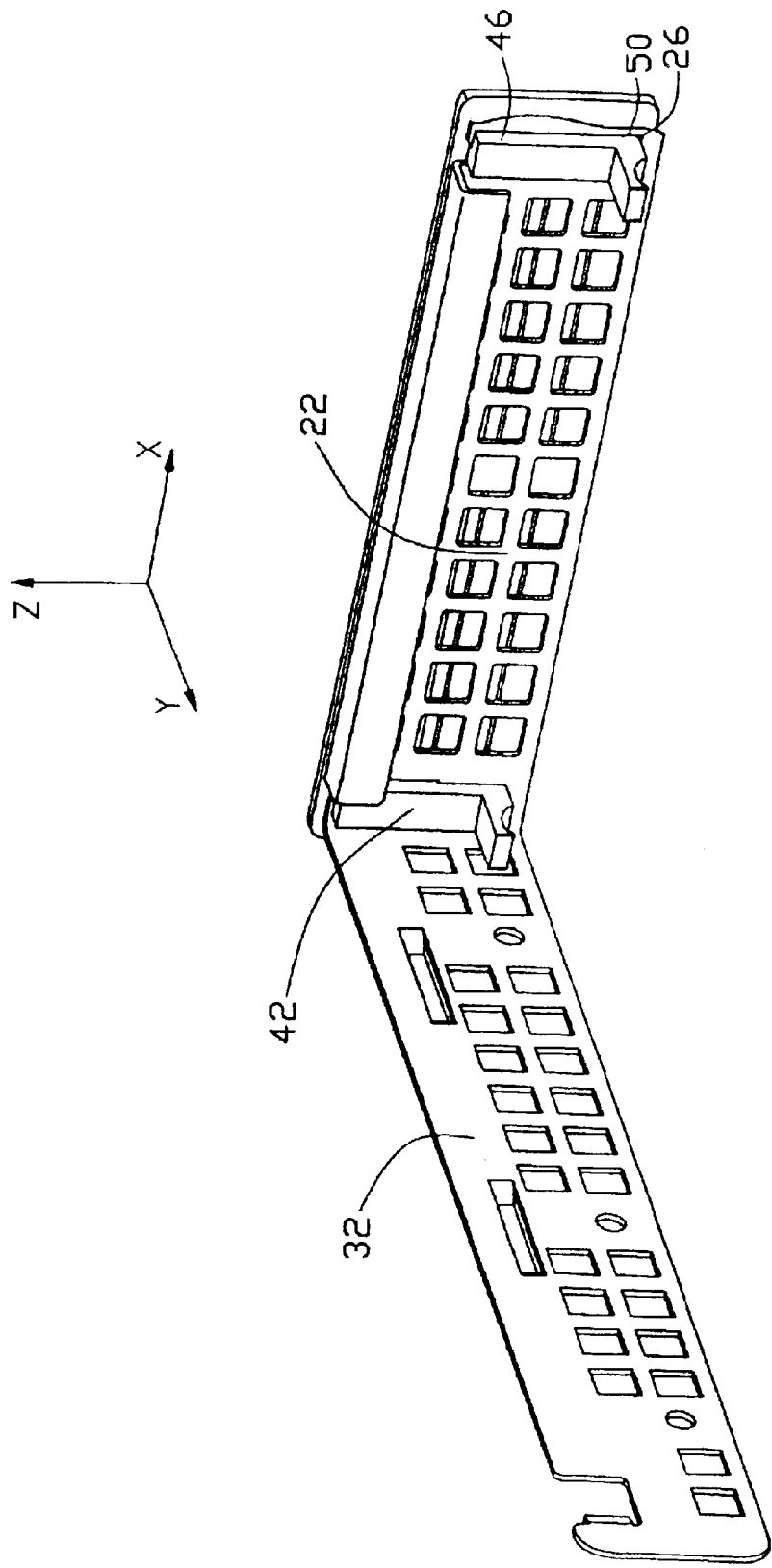
FIG. 3 is an enlarged, assembled view of the front bezel and the enclosure of FIG. 1, but with part of the enclosure cut away for clearer illustration.

Referring also to FIG. 3, in assembly, the HDD 60 is attached to the enclosure 20 by conventional means. The front bezel 40 is placed adjacent the front plate 22 of the enclosure 20. The engaging portions 44 are aligned with the corresponding slots 24 of the front plate 22. The front bezel 40 is pressed downwardly. The catches 50 are pushed rearwardly by reason of contact with the front plate 22, and the latches 42 are thus elastically deformed. When the engaging portions 44 reach bottom ends of the slots 24, the catches 50 snappingly engage in the corresponding cutouts 26. The latches 42 thus elastically return to their original states, such that the abutting portions 46 sandwich the front plate 22 with the body 41. The engaging portions 44 are thereby firmly engaged in the slots 24, and the front bezel 40 is securely attached to the enclosure 20.

In the present invention, engagement of the engaging portions 44 of the front bezel 40 in the slots 24 of the enclosure 20 positions the front bezel 40 in X axis directions. Engagement of the catches 50 in the cutouts 26 positions the front bezel 40 in Z axis directions. The abutting portions 46 and the body 41 sandwiching the front plate 22 therebetween position the front bezel 40 in Y axis directions. The front bezel 40 is accordingly securely attached to the enclosure 20.

In disassembly, the handles 52 are pulled rearwardly to cause the catches 50 of the front bezel 40 to release from the cutouts 26 of the front plate 22. The front bezel 40 is then moved upwardly to disengage from the front plate 22.

It is understood that the invention may be embodied in other forms without departing from the spirit thereof. Thus, the present example and embodiment is to be considered in all respects as illustrative and not restrictive, and the invention is not to be limited to the details given herein.

What is claimed is:

1. A front bezel assembly for an electronic device, comprising:

an enclosure adapted for securing the electronic device therein, the enclosure comprising a front plate, the front plate defining at least one slot and at least one cutout; and a front bezel comprising a body and at least one latch, the at least one latch comprising an engaging portion engaging in the at least one slot, an abutting portion sandwiching the front plate of the enclosure with the body, and a catch engaging in the at least one cutout; wherein the engaging portion extends perpendicularly from an inside of the body, and the abutting portion extends outwardly and downwardly from the engaging portion.

2. The front bezel assembly as claimed in claim 1, wherein engagement of the engaging portion in the at least one slot positions the front bezel in a first direction.

3. The front bezel assembly as claimed in claim 2, wherein engagement of the catch in the at least one cutout positions the front bezel in a second direction perpendicular to the first direction.

4. The front bezel assembly as claimed in claim 3, wherein the abutting portion and the body sandwiching the front plate therebetween positions the front bezel in a third direction perpendicular to both the first and second directions.

5. The front bezel assembly as claimed in claim 1, wherein the at least one latch further comprises a handle opposite the catch for facilitating operation thereof.

6. The front bezel assembly as claimed in claim 5, wherein the catch is formed at a bottom of the at least one latch facing the body, and the handle is formed at the bottom of the at least one latch distal from the body.

7. The front bezel assembly as claimed in claim 1, wherein the enclosure further comprises a pair of side plates extending substantially perpendicularly from the front plate.

8. A method for securing a front bezel to an enclosure, the method comprising the steps of;

a) providing an enclosure comprising a front plate defining a pair of slots in opposite ends thereof, and a pair of cutouts proximate respective slots, the slots extending along a first direction;

b) providing a front bezel comprising a body and a pair of latches, each of the latches comprising an engaging portion, an abutting portion, and a catch;

c) placing the front bezel adjacent the front plate, with the engaging portions of the front bezel aligning with corresponding slots of the front plate; and d) pressing the front bezel along said first direction until the engaging portions abut the front plate in terminal ends of the slots, the engaging portions engaging in the slots to position the front bezel in a second direction, the catches engaging in the cutouts to position the front bezel in the first direction, the abutting portions and the body sandwiching the front plate therebetween to position the front bezel in a third direction, the first, second and third directions all being perpendicular to one another.

9. The method as claimed in claim 8, wherein the engaging portion extends perpendicularly from an inside of the body, and the abutting portion extends outwardly and downwardly from the engaging portion.

10. The method as claimed in claim 9, wherein the catch is formed at a bottom of the corresponding latch, and faces the body.

11. The method as claimed in claim 10, wherein each of the latches further comprises a handle formed at the bottom thereof and opposite the corresponding catch, for facilitating operation thereof.

* * * * *